(12) United States Patent
Yeager et al.

(10) Patent No.: US 9,435,284 B2
(45) Date of Patent: Sep. 6, 2016

(54) IN-RANGE SENSOR FAULT DIAGNOSTIC SYSTEM AND METHOD

(71) Applicant: Caterpillar Inc., Peoria, IL (US)

(72) Inventors: Mary L. Yeager, Lafayette, IN (US);
Francis L. Clark, Pekin, IL (US);
Brandon Gregory, Peoria, IL (US);
Parag Mehresh, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 81 days.

(21) Appl. No.: 14/570,392

(22) Filed: Dec. 15, 2014

(65) Prior Publication Data

US 2016/0169140 A1   Jun. 16, 2016

(51) Int. Cl.
| | |
|---|---|
| F02D 41/32 | (2006.01) |
| F02D 41/26 | (2006.01) |
| F02D 41/14 | (2006.01) |
| F02D 37/02 | (2006.01) |

(52) U.S. Cl.
CPC ............... *F02D 41/26* (2013.01); *F02D 37/02* (2013.01); *F02D 41/1444* (2013.01)

(58) Field of Classification Search
CPC ............... F02D 41/14; F02D 41/1444; F02D 41/1448; F02D 41/26; F02D 41/32; F02D 37/02; F02D 35/023; F02D 2041/286
See application file for complete search history.

(56) References Cited

U.S. PATENT DOCUMENTS

| | | | |
|---|---|---|---|
| 5,474,045 A  * | 12/1995 | Demizu | F02D 35/023 |
| | | | 123/406.47 |
| 6,651,490 B1* | 11/2003 | Ceccarani | F02D 41/1448 |
| | | | 73/114.74 |
| 7,073,485 B2 | 7/2006 | Truscott et al. | |
| 2014/0048038 A1 | 2/2014 | Yasuda | |

FOREIGN PATENT DOCUMENTS

| | | |
|---|---|---|
| DE | 10233583 A1 | 2/2004 |
| JP | 2006-234469 A | 9/2006 |
| JP | 2010-127102 A | 6/2010 |
| JP | 2012-077729 A | 4/2012 |

OTHER PUBLICATIONS

Lee et al., "An In-Cylinder Pressure Referencing Method Based on a Variable Polytropic Coefficient," SAE International, 2007, 13 pp.

* cited by examiner

*Primary Examiner* — Hieu T Vo
(74) *Attorney, Agent, or Firm* — Ledig, Voit & Mayer, Ltd.

(57) ABSTRACT

An internal combustion engine includes an electronic controller programmed to determine, for at least one combustion event in a combustion chamber, a theoretical polytropic constant, a measured polytropic constant, and a difference between the theoretical polytropic constant and the measured polytropic constant. The electronic controller is further programmed to calculate an adjusted pressure signal based on the pressure signal and the difference such that the adjusted pressure signal compensates for changes to an accuracy of the pressure sensor over time.

20 Claims, 5 Drawing Sheets

IN-RANGE SENSOR FAULT DIAGNOSTIC SYSTEM AND METHOD

TECHNICAL FIELD

This patent disclosure relates generally to internal combustion engines and, more particularly, to systems and methods for in-cylinder engine pressure sensor diagnostics.

BACKGROUND

Internal combustion engines have many components that can affect the reliable and efficient operation of the engine. Engine operation and performance may be especially affected by the condition of those components that are associated with the engine's combustion cylinders such as intake and exhaust valves, piston rings, head gaskets and the like. Failures can occur for various reasons, such as thermal cycling, fatigue and the like. When such components fail, or their performance is compromised by a less than complete failure, the effects of such failure may not be immediately apparent to the engine's operator. However, such failures may cause a reduction in engine power, loss of sufficient sealing of the engine's combustion cylinder, increased oil consumption, decreased fuel economy, and other effects.

Even in the absence of a component-related condition, in-cylinder engine combustion may be further affected by various environmental factors such as ambient air temperature, barometric pressure, fuel quality, engine core temperature, and other factors. Such environmental factors, in addition to or instead of engine component conditions, may result in issues with engine combustion including misfire, detonation of the fuel/air mixture, and/or pre-ignition. Apart from adversely affecting engine fuel consumption, noise, roughness, emissions, and power output, improper combustion can also result in premature engine component failure, engine starting issues, and others.

Modern engines may further include variable valve timing systems, which can actively and selectively control engine valve timing. The calibration of such systems and their performance degradation over time may also affect ignition timing and cause varying degrees of abnormal engine combustion, which can in turn affect engine performance and emissions. The detection and diagnosis of abnormal engine combustion is a time consuming task because it traditionally entails running the engine in a diagnostic or service mode with instrumentation added to the engine to detect abnormalities. Moreover, abnormal combustion that is imperceptible to the user may go undetected. In the past, various attempts have been made to diagnose such engine conditions during normal engine operation by use of pressure sensors configured to measure cylinder pressure within the cylinder.

For improving the accuracy of such pressure sensors, it has been proposed to reference the cylinder pressure measurement based on a variable polytropic coefficient, as described in SAE Paper No. 2007-01-3535, by Lee et al. ("Lee"), which is entitled "An In-Cylinder Pressure Referencing Method Based on a Variable Polytropic Coefficient." Lee describes that the successful monitoring of the combustion process depends on the accurate measurement of in-cylinder pressure. According to Lee, piezoelectric transducers are normally used for in-cylinder pressure measurement, but rapid changes in the temperature of the transducer housing and the quartz sensing element included therein can change the transducer offset voltage. Lee proposes that piezoelectric transducers require referencing the output of the absolute pressure (pegging), and the study of Lee reviews several pegging methods and proposes a modified pegging method based on a variable polytropic coefficient. However, Lee's methods are insufficient to accurately detect an in-range fault for a pressure sensor consistently and with good repeatability.

SUMMARY

In one aspect, the disclosure describes an internal combustion engine. The internal combustion engine includes at least one cylinder, a piston reciprocally disposed within the at least one cylinder and defining a combustion chamber having a variable volume, and a crankshaft connected to the piston such that reciprocal motion of the piston results in rotational motion of the crankshaft. The internal combustion engine further includes a pressure sensor disposed to sense a cylinder pressure within the combustion chamber and provide a pressure signal, which is indicative of the cylinder pressure, and an engine timing sensor disposed to sense an angle of a rotating component of the engine that is related to the crankshaft, and provide an engine timing signal, which is indicative of a position of the piston within the cylinder bore. The internal combustion engine further includes an electronic controller programmed to receive the pressure signal and the engine timing signal, wherein the electronic controller is programmed to determine, for at least one combustion event in the combustion chamber: a theoretical polytropic constant, a measured polytropic constant, and a difference between the theoretical polytropic constant and the measured polytropic constant. The electronic controller is further programmed to calculate an adjusted pressure signal based on the pressure signal and the difference such that the adjusted pressure signal compensates for changes to an accuracy of the pressure sensor over time.

In another aspect, the disclosure describes a method for diagnosing an in-range fault of a cylinder pressure sensor in an internal combustion engine. The method includes monitoring a pressure signal from an engine pressure sensor, which is indicative of a fluid pressure within a combustion chamber of the internal combustion engine, and monitoring an engine timing signal from an engine timing sensor, which is indicative of a rotation of an output shaft of the internal combustion engine and also indicative of a position of a piston within the at least one cylinder. The method further includes receiving the pressure signal from the engine pressure sensor and the engine timing signal from the engine timing sensor in the electronic controller, analyzing the pressure and engine timing signals using the electronic controller, to determine, for at least one combustion event in the combustion chamber: a theoretical polytropic constant, a measured polytropic constant, and a difference between the theoretical polytropic constant and the measured polytropic constant. In accordance with the method, an adjusted pressure signal is calculated using the electronic controller and based on the pressure signal and the difference such that the adjusted pressure signal compensates for changes to an accuracy of the pressure sensor over time.

In yet another aspect, the disclosure describes a method for diagnosing a fault in a cylinder pressure sensor. The method includes calculating a theoretical polytropic relation relative to a combustion event, determining a theoretical polytropic constant, using a cylinder pressure signal and a position signal of an engine piston within an engine bore to calculate an actual polytropic relation for the combustion event, determining a measured polytropic constant, comparing the theoretical polytropic constant with the measured polytropic constant to determine an adjustment value, and using the adjustment value to correct the pressure signal.

DETAILED DESCRIPTION

This disclosure relates to internal combustion engines and, more particularly, to the diagnosis of the operation of one or more cylinder pressure sensors of an engine. In one disclosed embodiment, a cylinder pressure measurement from an in-cylinder pressure sensor, and a cylinder volume calculation based on a crankshaft angle position indication from a crankshaft or camshaft angle position sensor, are provided to an electronic controller that is programmed to calculate a single combustion event's polytropic constant using known or predetermined equations programmed within the controller. The calculated polytropic constant is compared to a theoretical value for the polytropic constant and a difference between the calculated and theoretical polytropic constants is determined. A correction to the cylinder pressure measurement is determined based on the difference and used during operation. In the event the adjustment and, therefore, the difference between the calculated and theoretical or expected polytropic constant exceeds a predetermined threshold, the pressure sensor output is deemed uncorrectable and a diagnostic fault flag is activated.

As used herein, the term "polytropic constant" generally refers to a constant used in the expression of a polytropic thermodynamic process, which in a general from obeys the equation $p*v \exp(n)=C$, where p represents engine cylinder pressure, v represents cylinder volume, n is a real number representing a polytropic index or polytropic coefficient value, and C is the polytropic constant. Various derivations and restrictions can be applied to this general expression, which can improve the accuracy of the determination. In general terms, the polytropic index or coefficient value, n, is known or predetermined and is largely based on the type of fuel used in the engine. For example, in a diesel engine, the polytropic index or coefficient value, under various assumptions including a negligible air mass in the cylinder and negligible heat transfer to the cylinder wall, is about 1.27. The type of fuel used in the engine, and the corresponding theoretical polytropic index or coefficient value, may be received in an electronic controller as a user input, or may alternatively be determined based on a dynamic calculation that occurs periodically, at every engine startup, at every fuel fill-up, or at any other appropriate time in which the composition of fuel provided to the engine may change.

Figure 1:
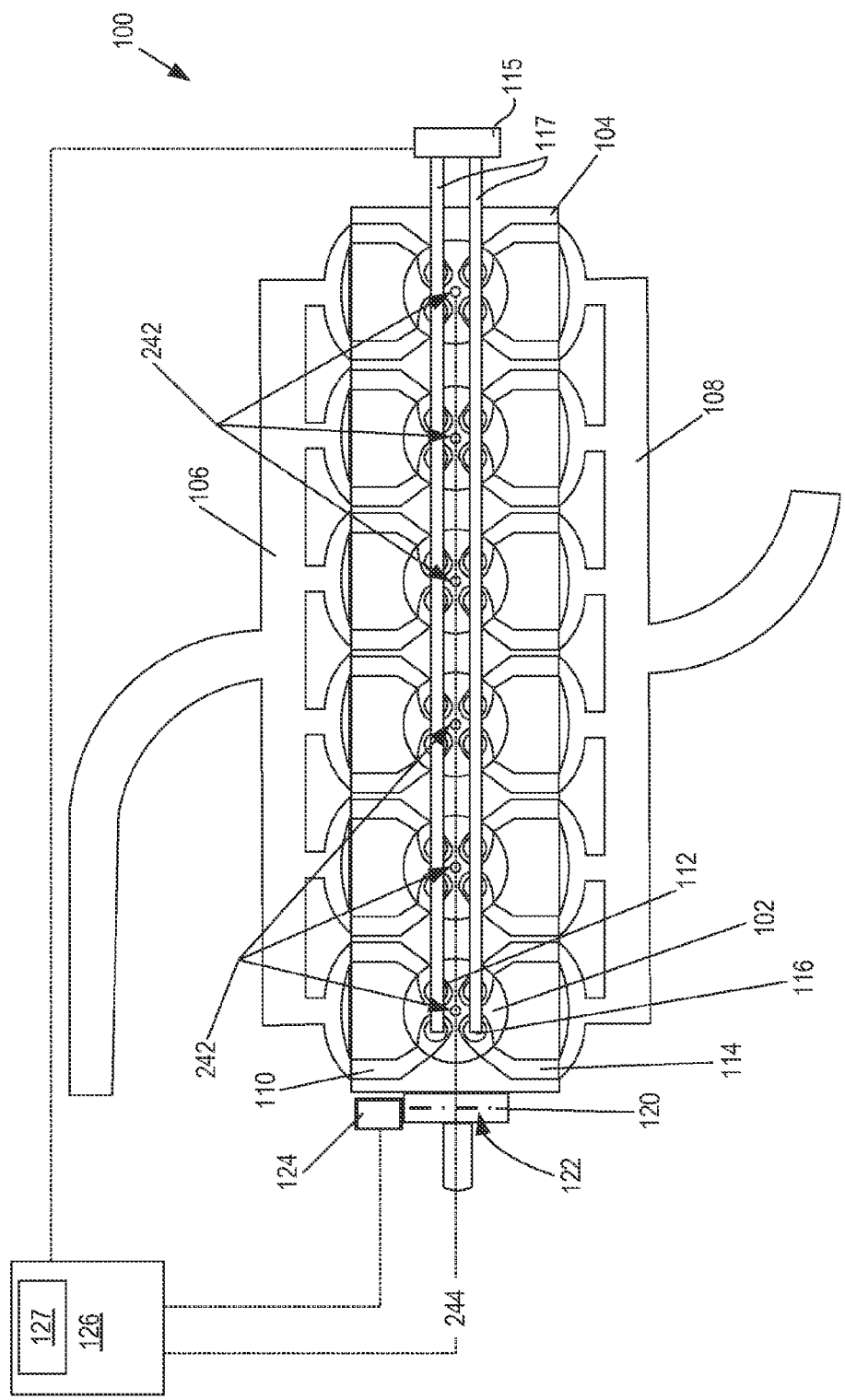
FIG. 1 is a block diagram representation of an internal combustion engine in accordance with the disclosure.

With the foregoing in mind, one embodiment for an engine diagnostic system will now be described. A block diagram of an engine 100 having a plurality of combustion cylinders, each of which is discussed herein as a combustion cylinder 102 formed within a cylinder block 104 is shown in FIG. 1. A detailed, enlarged view of a combustion cylinder 102 of the engine 100 (FIG. 1) is shown in cross section in FIG. 2. In the two illustrations of FIGS. 1 and 2, same or similar elements and features are denoted by the same reference numerals for simplicity.

Figure 2:
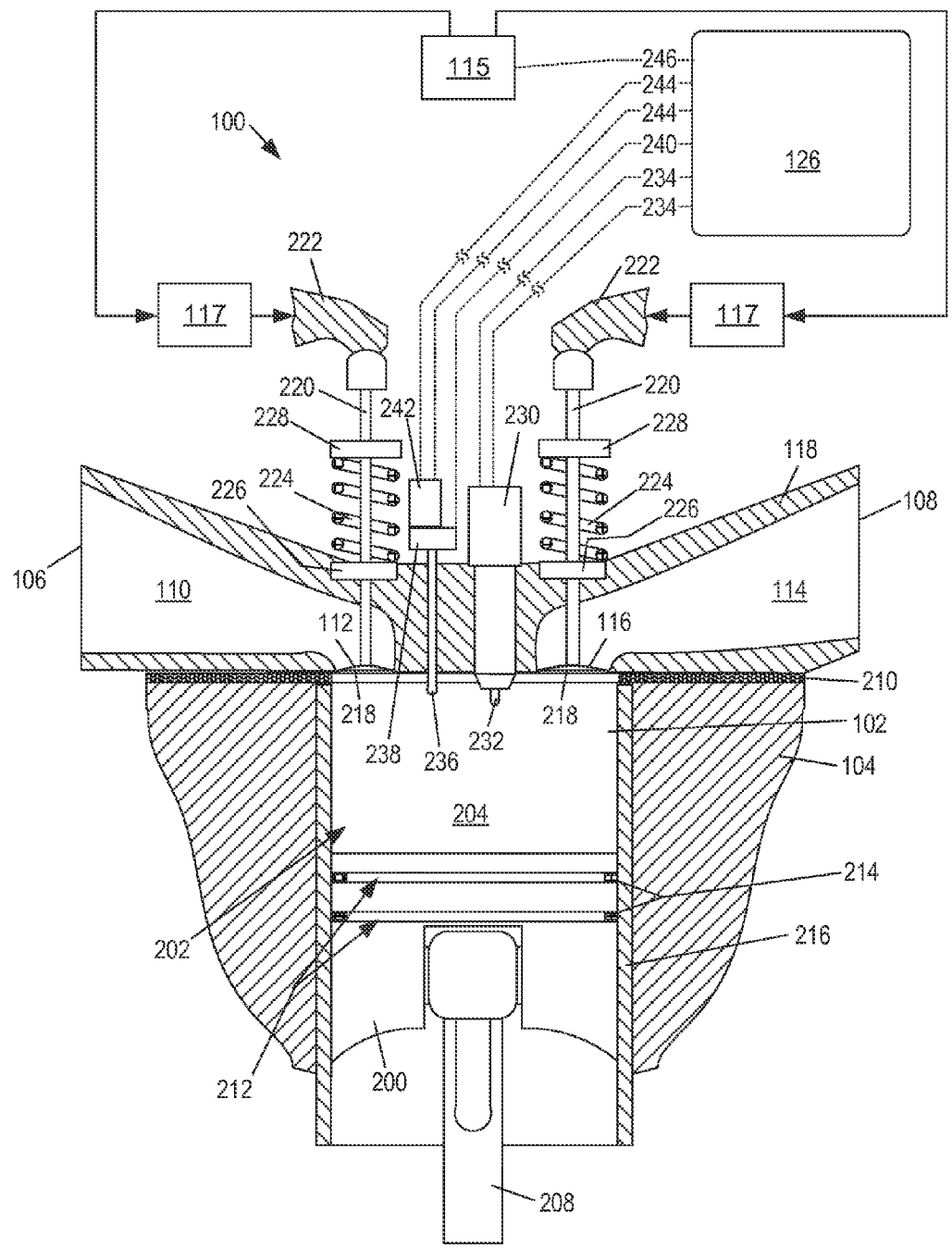
FIG. 2 is a detailed, enlarged view of a combustion cylinder of an engine, which is shown in cross section, in accordance with the disclosure.

The engine 100 includes an intake manifold 106 and an exhaust collector 108 in fluid communication with each combustion cylinder 102. In the illustrated embodiment, the intake manifold 106 fluidly communicates with each combustion cylinder 102 via intake runners 110 that are fluidly connectable to each combustion cylinder 102 when corresponding intake valves 112 are open. Similarly, the exhaust collector 108 is connectable with each combustion cylinder 102 via exhaust runners 114 through exhaust valves 116. Activation of the intake valves 112 and the exhaust valves 116 in the illustrated embodiment is accomplished by a variable valve activation system 115, which includes actuators 117 associated with the various valves. As shown in FIG. 2, the intake runners 110 and the exhaust runners 114 are at least partially formed within a cylinder head 118, but any one of a number of other known engine configurations may be used.

Each combustion cylinder 102 includes a piston 200 that is configured to reciprocate within a bore 202. The portion of the bore 202 between the piston 200 and the cylinder head 118 defines a combustion chamber 204 that is generally sealed when combustion of an air/fuel mixture occurs. Air for the air/fuel mixture, which may further include other fluids such as exhaust gas, and/or a gaseous fuel, is provided to the combustion chamber 204 generally through the intake runners 110. Fuel is provided to the combustion chamber from an injector 230, which in the illustrated embodiment is configured to directly inject fuel into the chamber. In different engines or in alternative embodiments, the injector or another fuel delivery valve may be located elsewhere in the engine such that fuel and air are premixed before being provided to the combustion chamber 204.

When in the combustion chamber 204, the air/fuel mixture is compressed as the piston 200 moves to reduce the volume of the combustion chamber 204 until combustion occurs. Following combustion, exhaust gas remaining in the combustion chamber 204 is evacuated into the exhaust collector 108 through the exhaust valves 116. The reciprocal motion of the piston 200 is transformed to rotary motion of a crankshaft 120 (FIG. 1). The crankshaft 120, which is typically connected to the piston 200 via a connecting rod 208 (FIG. 2), includes indicia or other features 122 that are detectable by a crankshaft position sensor 124 (FIG. 1) during operation. Information or signals from crankshaft position sensor 124 are provided to an electronic controller 126, which includes non-volatile memory 127. The position of other rotating components of the engine may be provided in addition to or instead of the crankshaft position. The information on the angle of the crankshaft 120 can be directly correlated to the position of the piston 200 within the cylinder. The quality of the sealed containment of the air/fuel combustion mixture within the combustion chamber 204, various environmental factors, as well as fuel quality and accuracy in the fuel delivery of the fuel system, among other factors, have been known to directly affect the efficiency and quality of engine operation, and especially the timing of compression ignition and the burn duration and intensity of the fuel burning in the combustion chamber 204 during engine operation.

In the illustrated embodiment, various engine components contribute to the various sealing functions provided to the combustion chamber 204 during operation. As is best shown in FIG. 2, a head gasket 210 is sealably positioned along the interface between the cylinder block 104 and the cylinder head 118 such that leakage of fluids is minimized along that interface. The piston 200 includes a plurality of piston ring grooves 212 (two shown) along its outer periphery. Each of the piston ring grooves 212 includes a piston ring seal 214 that radially, slidably, and generally sealably engages the inner wall of the bore 202. Although the bore 202 against which the piston ring seal 214 slides may be formed directly into the cylinder block 104, the engine 100 is shown in FIG. 2 to include a cylinder sleeve 216 within which the bore 202 is defined.

The intake valves 112 and the exhaust valves 116 are poppet-style valves forming seats that fluidly block the intake runners 110 and the exhaust runners 114, respectively, from the combustion chamber 204 when the intake valves 112 and exhaust valves 116 are closed. Accordingly, each of the intake valves 112 and the exhaust valves 116 forms a poppet portion 218 that sealably engages a corresponding seat formed in the cylinder head 118. Each of the intake valves 112 and exhaust valves 116 includes a stem portion 220 connected to the poppet portion 218. The stem portion 220 includes a ball and socket connection arrangement with a bridge 222 (partially shown). Rocking motion of the bridge 222 causes the opening and closing of the intake valves 112 and the exhaust valves 116, as is known. Activation of the bridge 222 is responsive to the selective motion of the actuators 117, which may directly activate each bridge 222 or may alternatively shift an activation phase of the bridge activation in response to the selective operation of the variable valve activation system 115, which is responsive to a valve timing signal 246. A spring 224 disposed between a guide 226 and a retainer 228 biases each of the intake valves 112 and the exhaust valves 116 towards a closed position. Although one configuration for the structure, installation and actuation of the intake valves 112 and the exhaust valves 116 is shown herein, any other appropriate configuration for selective or variable valve activation may be used.

In the illustrated embodiment, a fuel injector 206 includes a nozzle tip 232 disposed in fluid communication with the combustion chamber 204 and configured to selectively inject an amount of fuel into the combustion chamber 204 during operation. The fuel injected by the nozzle tip 232 mixes with air, a mixture of air with exhaust gas, and/or a mixture of air with a gaseous fuel that is present in the combustion chamber 204 to form a combustible mixture that is compressed before combustion in the known fashion. The injection of fuel from the injector 230 can be accomplished by providing an appropriate injection signal to the injector from the electronic controller 126 via injector communication conduits 234.

In the particular exemplary embodiment shown in FIG. 2, the engine 100 is a diesel engine. Accordingly, when operating or starting the engine under certain conditions, such as cold start conditions, a glow plug 236 can be disposed in fluid contact with the combustion chamber 204 to warm the air/fuel mixture in the combustion chamber 204 and thus aid in initiating burning of the combustible mixture. More specifically, the glow plug 236, which is an electrically operated heater, can provide thermal energy to the air/fuel mixture in the combustion chamber 204, thus reducing the flash point or ignition temperature of the mixture to aid in engine operation, especially under cold start engine operating conditions. The glow plug 236 as shown is connected to an actuator 238 that activates the device in response to a signal from the electronic controller 126 that is provided via a glow plug communication line 240.

In the illustrated embodiment, the presence and position of the glow plug 236 in direct contact with the combustion chamber 204 is exploited to provide an input indicative of the pressure of fluids within the combustion chamber 204. In this way, the glow plug 236 is slidably but sealably connected to the cylinder head 118 and communicates forces to a pressure sensor 242, which in the illustrated embodiment is connected on an external side of the glow plug 236. Alternatively, it is contemplated that the pressure sensor 242 may be directly connected to sense cylinder pressure without an intervening structure such as the glow plug as shown herein. In one embodiment, the pressure sensor 242 may use a combination of a piezoresistive element and a strain gage, which together provide signal indicative of cylinder pressure. The pressure sensor 242 may otherwise be constructed by any appropriate and known method, such as those including piezoelectric elements, optical devices, strain devices and others. Alternatively, the pressure sensor 242 may be connected in direct fluid communication with the combustion chamber 204.

Regardless of the type and positioning employed for the installation of the pressure sensor 242, a signal directly indicative of the pressure, in real time, of fluids within the combustion chamber 204 is provided to the electronic controller 126 via pressure signal communication lines 244. Certain sensor configurations, such as those sensors using piezoelectric elements, may be further configured to provide a signal indicative of vibration experienced by the sensor, for example, when intake or exhaust valves close, during engine operation.

The electronic controller 126 may be a single controller or may include more than one controller disposed to control various functions and/or features of a machine. For example, a master controller, used to control the overall operation and function of a vehicle, machine or stationary application may be cooperatively implemented with an engine controller used to control the engine 100. In this embodiment, the term "controller" is meant to include one, two, or more controllers that may be associated with the engine 100 and that may cooperate in controlling various functions and operations. The functionality of the controller, while shown conceptually in FIG. 3 to include various discrete functions for illustrative purposes only, may be implemented in hardware and/or software without regard to the discrete functionality shown. Accordingly, various interfaces of the controller are described relative to components of the engine in the block diagram of FIG. 1. Such interfaces are not intended to limit the type and number of components that are connected.

Figure 3:
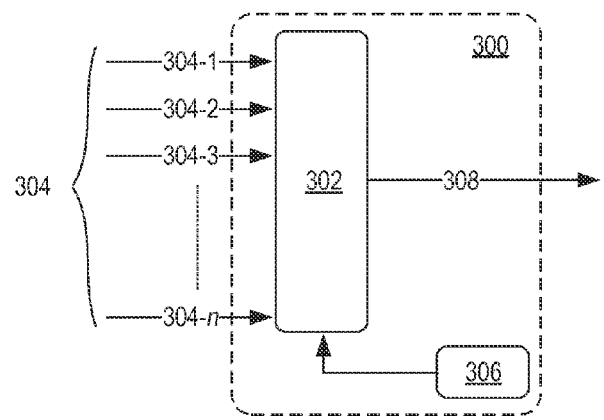
FIG. 3 is a block diagram for a diagnostic system in accordance with the disclosure.
Figure 4:
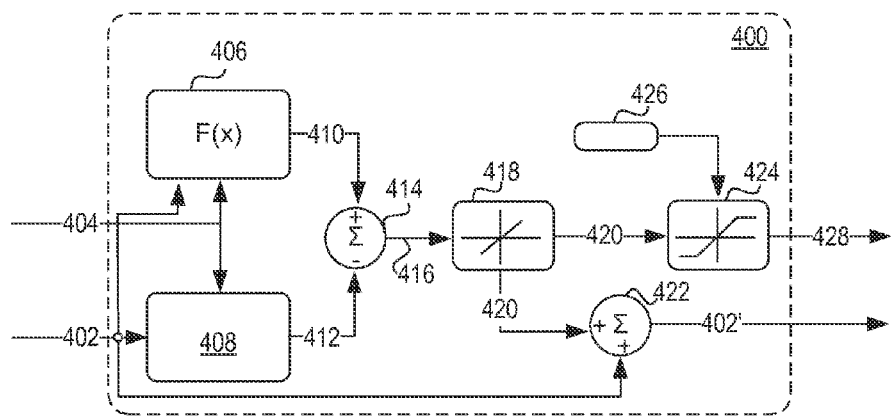
FIG. 4 is a block diagram for an additional diagnostic system in accordance with the disclosure.

Accordingly, a block diagram for a diagnostic control 300 configured to diagnose operation of the various cylinder pressure sensors of the engine is shown in FIG. 3. The diagnostic control 300 is configured to, in one aspect, detect a failure in a cylinder pressure sensor by comparing the readings from various cylinder pressure sensors on an engine to one another. For example, a cylinder pressure sensor disposed in each of the engine cylinders can be indicated as having failed when the signal from the that sensor is inconsistent with the signals from the remaining sensors. Alternatively, an inconsistency may indicate a failure in the engine cylinder components. In either case, identification of such failure is useful.

To accomplish this task, a comparator function 302 receives a plurality of pressure signals 304, which are denoted as 304-1, 304-2, 304-3, 304-4 . . . 304-$n$, where n denotes the number of cylinders in the engine. For example, in the illustrated embodiment, for the engine 100 (FIG. 1), there are six cylinders and, thus, n=6. Each pressure sensor 242 will provide a corresponding one of the plurality of pressure signals 304 to the comparator function 302. The comparator function 302, in one embodiment, operates to analyze each of the plurality of pressure signals 304 to determine at least some metrics for each, for example, peak cylinder pressure, ignition initiation, pressure rise rate, and others.

Each of the metrics determined for each of the plurality of pressure signals 304 may be compared with a corresponding threshold value and/or band of acceptable values, which are collectively stored in a table 306 and retrieved on-demand and on a continual basis from the comparator function 302 during operation. In addition to the values retrieved from the table 306, the comparator function 302 further operates to compare the pressure signal acquired from each sensor, as well as the parameters determined based on each pressure signal for each engine cylinder to those corresponding parameters for each of the remaining engine cylinders such that differences from cylinder-to-cylinder, and also from sensor-to-sensor, can be identified. In one embodiment, the table 306 may alternatively be a real-time calculation or function based on cylinder pressure parameters such as peak pressure, rate of pressure rise, rate of heat release, indicated mean effective pressure (IMEP) and/or other parameters, as well as a calculation or function based on other engine sensors or measurements such as fuel rate, engine speed, manifold pressure/temperature, and the like. In such embodiment, the thresholds that are provided to the comparator function 302 are dynamically determined in real time.

In other words, to the extent that cylinder-to-cylinder variability in an engine can be quantified in terms of the pressure signal for each cylinder, and while each engine cylinder is operating normally, then an in-range failure of a cylinder pressure sensor can be determined based on a comparison of the output of each cylinder pressure sensor with the output of each of the remaining engine cylinders and, alternatively or additionally, with the expected values of various cylinder operating parameters that are based on the cylinder pressure signal. When one of the plurality of pressure signals 304 indicates that an issue with the particular engine cylinder and/or the particular cylinder pressure is present, the comparator function 302 provides a fault signal 308. The fault signal 308 may be an inactive signal that is activated when a failure is detected, or may alternatively be an active signal whose value is changed when the failure is detected. The fault signal 308, when active, may provide information about the particular failure identified and also about the particular engine cylinder in which the failure has been detected.

For ensuring that sensor signals are reliable, and for correcting for aging and other effects, the system further includes a corrector control 400. The corrector control 400 is shown to apply to a single, pressure signal 402, but it is contemplated that a corrector control 400 can be duplicated for each additional, pressure signal 402 on the engine, or may, alternatively, apply to all such signals in the engine. In the illustrated embodiment, the corrector control 400 receives the pressure signal 402, which is indicative of the pressure in an engine cylinder, in real time. The corrector control 400 also receives an engine timing signal 404, which is indicative of crankshaft angle or another operating signal that can be used to infer the volume of any given engine cylinder at any given time. The pressure signal 402 and the engine timing signal 404 are provided to two functions: a theoretical polytropic constant calculator 406 and a measured polytropic constant calculator 408. As previously described, a polytropic constant is a calculation that is based on cylinder pressure and cylinder volume, which is largely based on the type of fuel being combusted. In this way, for an engine burning a known fuel, such as diesel, the polytropic constant can be theoretically calculated or estimated by using an appropriate function or relation, which is illustrated here as the theoretical polytropic constant calculator 406. For the most part, the theoretical polytropic constant calculator 406 will provide a theoretical polytropic constant 410, which will likely not change considerably during operation. In engines that burn different fuels, for example, gas, in which the energy content might considerably change, the theoretical polytropic constant calculator 406 may also change to reflect the particular fuel makeup being used. Such change can be made automatically, based on a measured polytropic constant at engine startup, or may changed based on a user input.

The measured polytropic constant calculator 408 operates to calculate a single combustion event's, measured polytropic constant 412 based on equations. For example, the calculator may solve for the polytropic constant, C, in the equation of the form $p*v \exp(n)=C$, where p represents engine cylinder pressure, v represents cylinder volume, n is a real number representing a polytropic index or polytropic coefficient value, and C is the polytropic constant. Of course, other equation forms can be used.

The theoretical polytropic constant 410 and the measured polytropic constant 412 are compared at a value comparator 414, which in the illustrated embodiment is shown as a subtractor but can take on any other appropriate form including other mathematical operators or functions. A difference 416 from the value comparator 414 between the theoretical polytropic constant 410 and the measured polytropic constant 412 is provided to a function 418, which is shown as a only-dimensional can take on any other appropriate mathematical construction and which correlates the difference with an adjustment value 420. The adjustment value 420 represents a correction factor to the cylinder pressure measurement, for example, the pressure signal 402, that can correct or rectify a drift in sensor readings over time due to aging and other effects. The adjustment value 420 is thus provided to an adder 422, which adds the adjustment value 420 to the pressure signal 402 to provide an adjusted pressure signal 402'. The adjusted pressure signal 402' can be used in place of the pressure signal 402, which is provided in "raw" or uncorrected form directly from the cylinder pressure sensor, in various operations and calculations in the controller.

The adjustment value 420 is also provided to a limiter function 424, which monitors the adjustment value 420 and compares it to a threshold 426 to determine whether the adjustment value 420 exceeds the threshold. An excessively high (or low) adjustment value 420 that exceeds the threshold 426 prompts a fault indication 428 to be provided, which is indicative of a condition in which the readings of one or more cylinder pressure sensors has drifted unacceptably far from its expected value, i.e., that there is an in-range fault at the sensor.

In the illustrated embodiment, the diagnostic threshold values 426 may be fixed and predetermined, or may alternatively be adjusted or calculated dynamically depending on engine operating condition, as indicated, for example, by engine speed and load, and/or environmental parameters such as ambient temp, pressure, humidity, and the like. If the cylinder pressure sensor adjustment during operation, as indicated, for example, by the adjustment value being outside of the diagnostic thresholds.

INDUSTRIAL APPLICABILITY

The present disclosure is applicable to internal combustion engines of any type and for any application. In the illustrated embodiments, the engine described is shown as having a pressure sensor associated with each engine cylinder. In alternative embodiments, depending on the type of abnormal combustion being diagnosed and/or addressed, pressure sensors can be used in one or, at least, in fewer than all engine cylinders. Alternatively, more than one pressure sensor may be used in the same engine cylinder.

The systems and methods described herein are applicable for diagnosing cylinder pressure sensor performance issues that can generate in-range faults in the readings or signals provided by such sensors. As a practical consideration, out of range sensor faults can be easily determined, and are usually determined, by comparing the sensor readings with absolute values, for example, zero to five volts. In-range faults, however, cannot be easily determined in this fashion. In accordance with the present disclosure, in-range faults are determined by various methods. In one method, the readings from each cylinder pressure sensor in the engine is compared with the readings of other cylinder pressure sensors in the same engine. This can be done between more than one sensor installed on the same engine cylinder, or may alternatively be carried out by comparing sensor readings from different engine cylinders. In an alternative or additional method, the sensor readings are corrected to counter-act sensor drift by determining a correction or adjustment value based on the difference between a theoretical polytropic constant and a measured polytropic constant calculated for each combustion event in the same engine cylinder.

In one optional embodiment, depending on the type of sensor fault that is diagnosed, the controller may allow the engine to operate but at a reduced power output mode, or may alternatively ignore the readings from the faulty sensor and adopt in its place the reading from another sensor that is determined to be operating normally.

Figure 5:
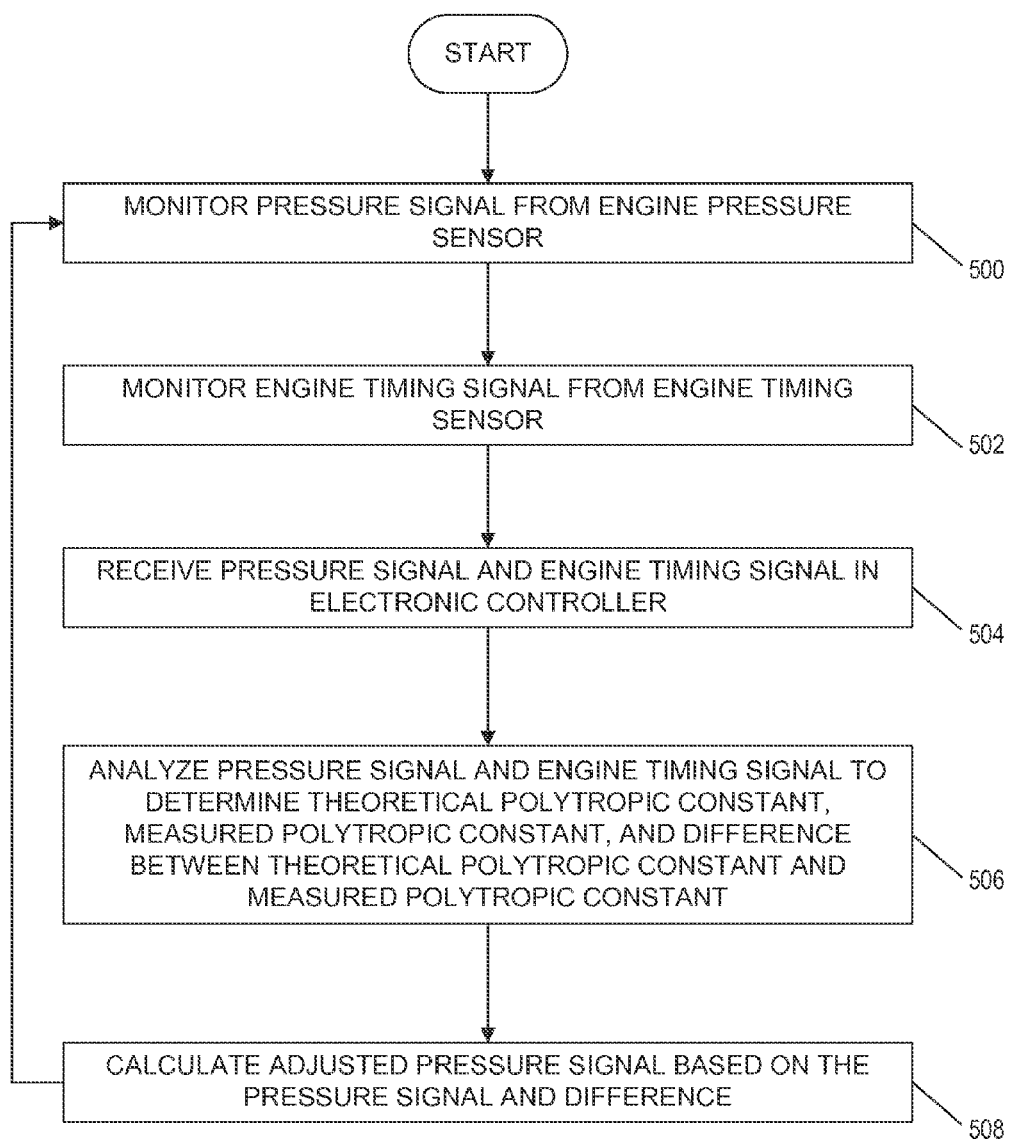
FIG. 5 is a flowchart for a method in accordance with the disclosure.

A flowchart for a method for diagnosing an in-range fault of a cylinder pressure sensor in an internal combustion engine is shown in FIG. 5. The method includes monitoring a pressure signal from an engine pressure sensor, which is indicative of a fluid pressure within a combustion chamber of the internal combustion engine, at 500. An engine timing signal from an engine timing sensor, which is indicative of a rotation of an output shaft of the internal combustion engine and also indicative of a position of a piston within at least one cylinder, is also monitored at 502. The pressure signal from the engine pressure sensor and the engine timing signal from the engine timing sensor are received in an electronic controller at 504, and analyzed to determine, for at least one combustion event in the combustion chamber, a theoretical polytropic constant, a measured polytropic constant, and a difference between the theoretical polytropic constant and the measured polytropic constant at 506. An adjusted pressure signal is calculated at 508, using the electronic controller, based on the pressure signal and the difference such that the adjusted pressure signal compensates for changes to an accuracy of the engine pressure sensor over time.

Figure 6:
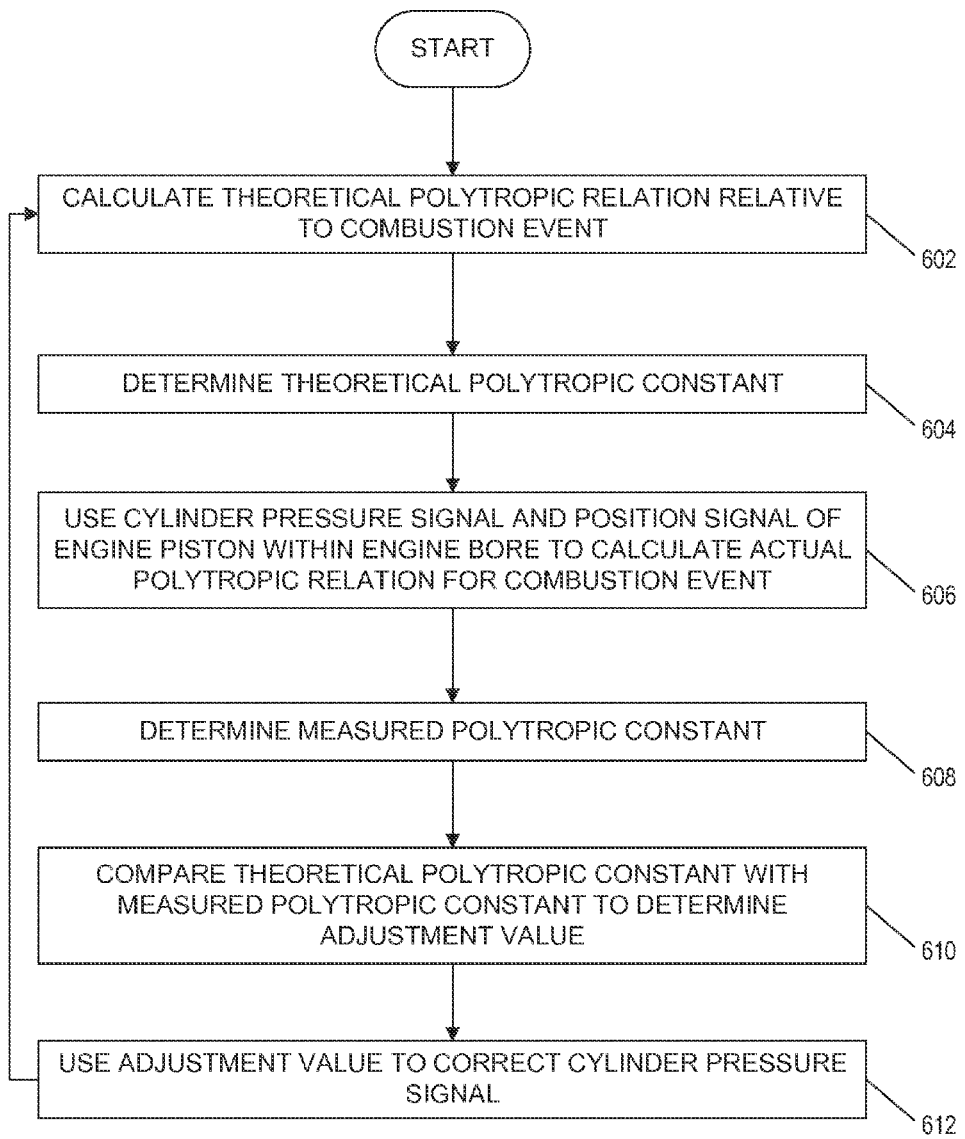
FIG. 6 is a flowchart for a method in accordance with the disclosure.

A flowchart for a method for diagnosing a fault in a cylinder pressure sensor is shown in FIG. 6. The method includes calculating a theoretical polytropic relation relative to a combustion event at 602, and determining a theoretical polytropic constant at 604. The method further includes using a cylinder pressure signal and a position signal of an engine piston within an engine bore to calculate an actual polytropic relation for the combustion event at 606, and determining a measured polytropic constant at 608. The theoretical polytropic constant is compared with the measured polytropic constant at 610 to determine an adjustment value, and the adjustment value is used to correct the cylinder pressure signal at 612.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:
1. An internal combustion engine, comprising:
at least one cylinder;
a piston reciprocally disposed within the at least one cylinder and defining a combustion chamber having a variable volume;
a crankshaft connected to the piston such that reciprocal motion of the piston results in rotational motion of the crankshaft;
a pressure sensor disposed to sense a cylinder pressure within the combustion chamber and provide a pressure signal, which is indicative of the cylinder pressure;
an engine timing sensor disposed to sense an angle of a rotating component of the internal combustion engine that is related to the crankshaft, and provide an engine timing signal, which is indicative of a position of the piston within a cylinder bore; and
an electronic controller programmed to receive the pressure signal and the engine timing signal;
wherein the electronic controller is programmed to determine, for at least one combustion event in the combustion chamber:
a theoretical polytropic constant,
a measured polytropic constant, and
a difference between the theoretical polytropic constant and the measured polytropic constant; and
wherein the electronic controller is further programmed to calculate an adjusted pressure signal based on the pressure signal and the difference, such that the adjusted pressure signal compensates for changes to an accuracy of the pressure sensor over time.

2. The internal combustion engine of claim 1, wherein the theoretical polytropic constant is determined based on a type of fuel provided to the combustion chamber.

3. The internal combustion engine of claim 1, wherein the measured polytropic constant is determined based on the pressure signal and the engine timing signal.

4. The internal combustion engine of claim 1, wherein the adjusted pressure signal is calculated as a sum of the pressure signal and the adjusted pressure signal.

5. The internal combustion engine of claim 1, wherein the electronic controller is further programmed to calculate an adjustment value as a function of the difference.

6. The internal combustion engine of claim 5, wherein the adjusted pressure signal is calculated in the electronic controller as a sum of the adjustment value and the pressure signal, in real time.

7. The internal combustion engine of claim 5, wherein the electronic controller is further programmed to compare the adjustment value with an adjustment value threshold.

8. The internal combustion engine of claim 7, wherein the electronic controller is further programmed to provide a fault indication when the adjustment value exceeds the threshold.

9. The internal combustion engine of claim 1, wherein the electronic controller is further programmed to receive a user input relative to a type of fuel that is burned in the combustion chamber, and to use the user input to determine the theoretical polytropic constant.

10. A method for diagnosing an in-range fault of a cylinder pressure sensor in an internal combustion engine, comprising:
monitoring a pressure signal from an engine pressure sensor, which is indicative of a fluid pressure within a combustion chamber of the internal combustion engine;
monitoring an engine timing signal from an engine timing sensor, which is indicative of a rotation of an output shaft of the internal combustion engine and also indicative of a position of a piston within at least one cylinder;
receiving the pressure signal from the engine pressure sensor and the engine timing signal from the engine timing sensor in an electronic controller;
analyzing the pressure signal and the engine timing signal using the electronic controller, to determine, for at least one combustion event in the combustion chamber:
a theoretical polytropic constant,
a measured polytropic constant, and
a difference between the theoretical polytropic constant and the measured polytropic constant; and
calculating an adjusted pressure signal, using the electronic controller, based on the pressure signal and the difference such that the adjusted pressure signal compensates for changes to an accuracy of the engine pressure sensor over time.

11. The method of claim 10, further comprising determining the theoretical polytropic constant based on a type of fuel provided to the combustion chamber.

12. The method of claim 10, further comprising determining the measured polytropic constant based on the pressure signal and the engine timing signal.

13. The method of claim 10, further comprising calculating the adjusted pressure signal as a sum of the pressure signal and the adjusted pressure signal.

14. The method of claim 10, further comprising calculating in the electronic controller an adjustment value as a function of the difference.

15. The method of claim 14, wherein the adjusted pressure signal is calculated in the electronic controller as a sum of the adjustment value and the pressure signal, in real time.

16. The method of claim 14, further comprising comparing, using the electronic controller, the adjustment value with a threshold.

17. The method of claim 16, further comprising providing a fault indication when the adjustment value exceeds the threshold.

18. A method for diagnosing a fault in a cylinder pressure sensor, comprising:
calculating a theoretical polytropic relation relative to a combustion event;
determining a theoretical polytropic constant;
using a cylinder pressure signal and a position signal of an engine piston within an engine bore to calculate an actual polytropic relation for the combustion event;
determining a measured polytropic constant;
comparing the theoretical polytropic constant with the measured polytropic constant to determine an adjustment value; and
using the adjustment value to correct the cylinder pressure signal.

19. The method of claim 18, further comprising declaring a sensor fault when the adjustment value exceeds a threshold.

20. The method of claim 18, wherein the theoretical polytropic constant depends primarily on a fuel type used for the combustion event.

* * * * *